United States Patent
Madeira et al.

(10) Patent No.: US 11,286,044 B2
(45) Date of Patent: Mar. 29, 2022

(54) METHOD OF REGULATING A POWER PLANT OF A ROTORCRAFT, AND AN ASSOCIATED ROTORCRAFT

(71) Applicant: AIRBUS HELICOPTERS, Marignane (FR)

(72) Inventors: Alexandre Madeira, Aix en Provence (FR); Olivier Honnorat, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 149 days.

(21) Appl. No.: 16/859,197

(22) Filed: Apr. 27, 2020

(65) Prior Publication Data
US 2020/0346744 A1  Nov. 5, 2020

(30) Foreign Application Priority Data

Apr. 30, 2019  (FR) .................................. 1904559

(51) Int. Cl.
*B64C 27/06* (2006.01)
*B64F 5/60* (2017.01)
(Continued)

(52) U.S. Cl.
CPC ............ *B64C 27/06* (2013.01); *B64C 27/57* (2013.01); *B64D 31/04* (2013.01); *B64D 31/06* (2013.01); *B64D 31/14* (2013.01); *B64F 5/60* (2017.01)

(58) Field of Classification Search
CPC ......... B64C 27/06; B64C 27/57; B64D 31/04; B64D 31/06; B64D 31/14; B64F 5/60
See application file for complete search history.

(56) References Cited

U.S. PATENT DOCUMENTS 6,198,991 B1   3/2001  Yamakawa et al.
9,463,874 B2 * 10/2016  Vallart ................. G05D 1/0858
(Continued)

FOREIGN PATENT DOCUMENTS

EP    3444187 A1   2/2019
WO  2008048245 A2   4/2008
(Continued)

OTHER PUBLICATIONS

French Search Report for French Application No. FR1904559, Completed by the French Patent Office, dated Feb. 18, 2020 10 pages.

*Primary Examiner* — James M McPherson
*Assistant Examiner* — Kyle J Kingsland
(74) *Attorney, Agent, or Firm* — Brooks Kushman P.C.

(57) ABSTRACT

A rotorcraft and to a regulation method for regulating a power plant of a rotorcraft, the power plant having two engine units and a main gearbox, the two engine units being suitable for mechanically driving the main gearbox in order to drive an outlet main shaft of the main gearbox in rotation, the outlet main shaft being constrained to rotate with a main rotor of the rotorcraft, the two engine units including a first engine unit including at least one main engine. In accordance with the invention, such a regulation method includes at least one regulation step consisting in regulating a speed of rotation of the at least one main engine by progressively reducing a current setpoint by an increment i in percentage of the current setpoint per second.

20 Claims, 6 Drawing Sheets

(51) Int. Cl.
  *B64D 31/04* (2006.01)
  *B64D 31/06* (2006.01)
  *B64D 31/14* (2006.01)
  *B64C 27/57* (2006.01)

(56) References Cited

U.S. PATENT DOCUMENTS

| | | |
|---|---|---|
| 10,752,342 B2 * | 8/2020 | Taheri .................. F02C 3/10 |
| 2014/0229037 A1 | 8/2014 | Dequin et al. |
| 2017/0088281 A1 | 3/2017 | Vallart et al. |
| 2018/0009542 A1 * | 1/2018 | Kuster .................. B64D 31/06 |

FOREIGN PATENT DOCUMENTS

| | | |
|---|---|---|
| WO | 2010143051 A2 | 12/2010 |
| WO | 2010143051 A3 | 1/2012 |

* cited by examiner

METHOD OF REGULATING A POWER PLANT OF A ROTORCRAFT, AND AN ASSOCIATED ROTORCRAFT

CROSS-REFERENCE TO RELATED APPLICATIONS

This application claims priority to European patent application No. FR 19 04559 filed on Apr. 30, 2019, the disclosure of which is incorporated in its entirety by reference herein.

BACKGROUND OF THE INVENTION

(1) Field of the Invention

The present invention relates to a method of regulating a power plant of a rotorcraft, and to a rotorcraft that applies said method. This regulation method thus makes it possible to cause the speed of rotation NR of a main rotor to vary, such a main rotor equipping the rotorcraft and making it possible to participate at least in providing lift, and possibly also in providing propulsion, for the rotorcraft in the air.

Thus, such a regulation method may also be applied in such a manner as to reduce the acoustic footprint of a rotorcraft on its outside environment.

(2) Description of Related Art

The speed of rotation NR of a main rotor of a rotorcraft is imposed by general dimensioning conditions that have a direct impact not only on the overall size of the rotor, on its weight, on the performance of the rotorcraft, on the level of safety, and on the induced noise, but also on the direct or indirect operating costs of such a rotorcraft.

Furthermore, a "nominal" (or "100%") value NRnom for the speed of rotation NR is generally defined for each rotor, by a tangential velocity lying in the range 210 meters per second ($m \cdot s^{-1}$) to 225 $m \cdot s^{-1}$ being obtained at the tips of the blades of the main rotor under such conditions.

Furthermore, and as disclosed, in particular, in Document WO 2008/048245, it is also known to cause the speed of rotation NR to vary about the nominal value NRnom. In that situation, a variation relationship is then applied to the speed of rotation NR. In that way, the speed of rotation NR can depart moderately from the nominal value NRnom as a function of the flight conditions and/or of the power needs of the rotorcraft for maneuvering purposes. Furthermore, such variation in the speed of rotation NR has the effects of modifying the performance of the rotorcraft and of modifying the level of its acoustic footprint.

For example, a variation relationship can make it possible to achieve a limited regulation of the speed of rotation NR as a function of a setpoint NR0 that generally lies in the range from a low value of about 98% of the nominal value NRnom to a high value of about 103% of the nominal value NRnom.

In addition, when the setpoint NR0 is close to the high value, the flight performance of the rotorcraft is optimized, in particular so as to perform certain critical flight phases such as landing or takeoff in particular by delivering a large lift margin to the rotor.

Conversely, when the setpoint NR0 is close to the low value, the level of the acoustic footprint of the rotorcraft on the outside environment can be minimized. Such limitation can be advantageous, for example, during certain less critical flight phases close to the ground and not requiring a lift margin or requiring only a small amount of lift margin.

However, with known methods of regulation, it is not possible to use a low value for the setpoint NR0 that is too low. Indeed, in the event of engine failure, if the speed of rotation NR of the rotor is too low then the lift margin of the rotor may prove insufficient to enable a pilot to perform an emergency maneuver.

Furthermore, when a pilot wishes to perform an autorotation maneuver, it may be dangerous to start from a speed of rotation NR that is too low. Such a maneuver would cause the rotorcraft to undergo a large fall before the speed of rotation NR of the rotor becomes high enough to be able to brake that fall.

Furthermore, Document US 2017/088281 discloses a method of regulating operation of one or more engines in a power plant equipping a rotorcraft. For example, such a power plant may have at least one main fuel-burning engine, such as, in particular, a turboshaft engine, conventionally delivering the mechanical power needed at least for driving one or more rotors equipping the rotorcraft.

In addition, such a method of automatically regulating the speed NR of a rotorcraft rotor is implemented only while the rotorcraft is taxiing or otherwise maneuvering on the ground, in particular in order to limit the noise generated by it before it takes off or after it lands. Such automatic regulation of the speed NR on the ground thus makes it possible, in particular, to improve the working conditions for operatives working in the immediate vicinity of the rotorcraft while it is maneuvering on the ground and to improve the sound comfort of the passengers and crew during the boarding and disembarking phases.

In that document, no automatic regulation of the speed NR is suggested in order to reduce the acoustic footprint of a rotorcraft in flight, i.e. as from a minimum height above the ground.

It is thus not envisaged to regulate the speed of rotation of the main engines by reducing a current setpoint for the speed NR progressively while the rotorcraft is flying in the air.

On the contrary, when an absolute velocity of movement on the ground is measured as being greater than a predetermined value V1, that regulation method then upwardly regulates a current setpoint for the speed NR by going from the second speed NR2 to the first speed NR1.

Document US2014/229037 relates to a method of driving at least one main rotor in rotation, that method implementing a method of determining a variable value for a regulation setpoint for regulating operation of a power plant for driving the main rotor in rotation. That regulation setpoint is, in particular, a function of a desired speed of rotation for driving the main rotor in rotation.

In addition, that document discloses progressive and continuous variation in the value of the initial setpoint as computed on the basis of a progressive and continuous variation in the value of a physico-chemical parameter, such as density, of the ambient air outside the rotorcraft.

However, that method of automatically regulating the speed NR does not make it possible to reduce the acoustic footprint of a rotorcraft as a function of the height of flight of the rotorcraft or of the velocity of movement of the rotorcraft.

Other methods of regulating the speed of rotation NR of a rotorcraft rotor are also disclosed in Documents U.S. Pat. No. 6,198,991, WO 2010/143051 and EP 3 444 187. However, those methods reflect a technological background of the invention.

BRIEF SUMMARY OF THE INVENTION

An object of the present invention is thus to propose a regulation method and a rotorcraft that enable the above-mentioned limitations to be overcome.

Furthermore, an objective of the regulation method of the invention is to reduce the acoustic fingerprint of a rotorcraft in flight on the outside environment without degrading the level of safety, and optionally without giving a pilot of the rotorcraft the impression of being faced with engine failure.

The invention thus relates to a regulation method for regulating a power plant of a rotorcraft, the power plant having two engine units and a main gearbox, the two engine units being suitable for mechanically driving the main gearbox so as to drive an outlet main shaft of the main gearbox in rotation, the outlet main shaft being constrained to rotate with a main rotor of the rotorcraft, the main rotor rotating at a speed of rotation (NR), the two engine units comprising a first engine unit including at least one main engine and a second engine unit including at least one secondary engine, the regulation method comprising at least:

a determination step for determining a first setpoint (NR1) for the speed of rotation (NR) of the main rotor;

a first regulation step for regulating operation of the main engine(s) on a current setpoint (NRi) for the speed of rotation (NR) that is equal to the first setpoint (NR1) for the speed of rotation (NR);

a first identification step making it possible to identify that the rotorcraft is flying at a height (H) that is greater than or equal to a predetermined threshold height (H1); and a second identification step making it possible to identify that the rotorcraft is flying at a velocity (V) that is greater than or equal to a predetermined threshold velocity (V1).

In accordance with the invention, such a regulation method is remarkable in that it further comprises a second regulation step suitable for being implemented when the first identification step and the second identification step are satisfied simultaneously, the second regulation step consisting in regulating a speed of rotation of the main engine(s) by progressively reducing the current setpoint (NRi) by an increment i in percentage of the current setpoint (NRi) per second, from the first setpoint (NR1) down to a second setpoint (NR2, NR2') that is less than the first setpoint (NR1), the second regulation step being implemented so long as a norm of an acceleration vector of the rotorcraft is less than 1 meter per second squared ($m \cdot s^{-2}$), i.e. 1 meter per second per second.

Furthermore, each main engine may advantageously be a fuel-burning engine such as, in particular an internal combustion engine or a turboshaft engine. The secondary engine may advantageously be constituted by an electric motor that can also operate at least temporarily as an electrical current generator for recharging batteries while it is not being used to drive the main rotor of the rotorcraft in rotation.

In other words, while the rotorcraft is flying at or above the predetermined threshold height (H1) and, at the same time, at or above the predetermined threshold velocity (V1), a regulation loop is activated. So long as the velocity of the rotorcraft is constant or almost constant, the current setpoint (NRi) decreases down to the second setpoint (NR2, NR2'). Conversely, if the velocity of the rotorcraft varies downwardly or upwardly, then the reduction in the current setpoint (NRi) can be stopped. Once the velocity of the rotorcraft becomes constant or almost constant again, the current setpoint (NRi) can start decreasing again down to the second setpoint (NR2, NR2').

Each main engine can then be controlled in such a manner as to cause the speed of rotation of the engine to tend towards the current setpoint (NRi). For example, a turboshaft engine can be regulated via two regulation loops, namely a first regulation loop for performing regulation as a function of a speed of rotation of a free turbine (NTL), which first regulation loop is nested in a second regulation loop for performing regulation as a function of the speed of rotation (NR) of the main rotor.

For example, in order to limit the risks related to this decrease in the current setpoint (NRi), the predetermined threshold height (H1) may be chosen to be equal to 1500 feet (about 457 meters). Similarly, the predetermined threshold velocity (V1) may be chosen to be equal to 80 knots (approximately 41 $m \cdot s^{-1}$). However, such threshold values may be adapted as a function of a safety level or of the performance required by a mission or indeed as a function of the flight capacities of the rotorcraft.

Conventionally, the norm of an acceleration vector of a rotorcraft may be computed on the basis of information relating to the position or to the velocity of the rotorcraft relative to the ground. Such a norm of the acceleration vector may also be computed on the basis of vector components of the acceleration vector that are measured directly by means of one or more accelerometers arranged on the rotorcraft. In addition, the second regulation step may be implemented preferably so long as the norm of the acceleration vector of the rotorcraft is less than 0.5 $m \cdot s^{-2}$, and even more preferably so long as the norm of the acceleration vector of the rotorcraft is less than 0.33 $m \cdot s^{-2}$.

Furthermore, the reduction in the speed of rotation of the main rotor is accompanied by a reduction in the lift of the main rotor. In order to compensate for this reduction, it is also possible, in parallel, to cause a collective increase in the pitch of the blades of the main rotor. Such an increase thus takes place simultaneously over all of the blades of the main rotor.

In addition, the order of implementation of the first identification step and of the second identification step is not important for such a regulation method. Thus, the second identification step may be implemented prior to the first identification step. Similarly, the first identification step and the second identification step may also be implemented prior to the determination step for determining the first setpoint (NR1) and/or prior to the first regulation step.

Furthermore, such a second regulation step may be deactivated automatically when at least one of the first and second identification steps is not satisfied.

Advantageously, the increment i may lie in the range −0.2% of the current setpoint (NRi) per second to −0.6% of the current setpoint (NRi) per second.

Such a progressive reduction in the current setpoint (NRi) for the speed of rotation (NR) is then optimum so as firstly not to be interpreted by a pilot as being a failure of one of the engines, and so as secondly to go quickly past resonant frequencies of the rotorcraft. Such resonant frequencies are to be avoided and they can considerably degrade the safety margins related to own resonant modes of the blades of the main rotor such as, for example, drag mode, flapping mode, and twisting mode.

In practice, the regulation method may further comprise a computation step for computing a current value (Czmi) for a mean vertical lift coefficient (Czm) of the main rotor, and a comparison step for comparing the current value (Czmi) for the mean vertical lift coefficient (Czm) with a threshold value (Czm1), the second setpoint (NR2, NR2') depending on a result of the comparison step.

In other words, the value of the second setpoint (NR2, NR2') may depend on the current value (Czmi) of the mean vertical lift coefficient (Czm). Furthermore, the threshold value (Czm1) may be pre-recorded in a first memory and/or be variable and defined by computations as a function of the geometry of the blades of the main rotor and of the flight conditions such as, for example, atmospheric pressure or temperature of the surrounding air.

Therefore, during the second regulation step, so long as the current value (Czmi) remains less than the threshold value (Czm1), the second setpoint (NR2) may lie in the range 60% of the nominal value (NRnom) to 85% of the nominal value (NRnom). By way of comparison, the first setpoint (NR1) may, for example, lie in the range 90% of the nominal value (NRnom) to 110% of the nominal value (NRnom).

In this situation, the second setpoint (NR2) may then be fixed and defined by computation, tests or simulations, and be pre-recorded in a second memory. For example, such a second setpoint (NR2) may be defined in such a manner as to obtain a tangential velocity of about 190 m·s$^{-1}$ at the tips of the blades of the main rotor.

In addition, the second setpoint (NR2) may, for example, be chosen to be equal to 70% of the nominal value (NRnom).

Conversely, during the second regulation step, if the current value (Czmi) reaches the threshold value (Czm1), the second setpoint (NR2') may correspond to the current setpoint (NRi) for the speed of rotation (NR), namely the value of the speed of rotation (NR) when the threshold value (Czm1) is reached. Such a characteristic then avoids reaching a speed of rotation (NR) of the main rotor that induces stalling.

Thus, the value of the second setpoint (NR2') may be defined so that the current value (Czmi) does not exceed the threshold value (Czm1). In addition, such a second setpoint (NR2') may lie in the range 70% of the nominal value (NRnom) to 100% of the nominal value (NRnom). Therefore, regardless of the situation, the second setpoint (NR2') is significantly less than the first setpoint (NR1), thereby making it possible to limit the acoustic footprint of the rotorcraft without giving rise to a risk of stalling and thus to a risk of degrading the safety level of the mission of the rotorcraft.

Advantageously, the threshold value (Czm1) may lie in the range 0.4 to 0.8, and it may preferably lie in the range 0.5 to 0.7.

Furthermore, in a particular example of the invention, the threshold value (Czm1) may be chosen to be equal to 0.58, which corresponds to a tangential velocity of the main rotor at the tips of the blades of 190 m·s$^{-1}$. Such a limitation of the threshold value (Czm1) thus makes it possible to avoid the rotorcraft stalling.

In addition, if the velocity of the rotorcraft increases consequent upon the second regulation step being implemented, said second regulation step may then increase the current setpoint (NRi) so as to follow the threshold value (Czm1) by means of a polynomial of the following type:

$$NR = C_0 + A \times Vh + B \times Vh^2 + C \times Zd + D \times Zd^2,$$

and where:
$C_0$, A, B, C, and D are functions dependent on the main rotor geometry and on the weight of the rotorcraft;
Vh represents the forward velocity of the rotorcraft relative to the air; and
Zd represents a density altitude of the rotorcraft.

In a first implementation of the invention, the second regulation step may be implemented manually by a pilot of the rotorcraft.

For example, a button or switch may be actuated by a pilot of the rotorcraft in such a manner as to start the second regulation step of the method.

In a second implementation of the invention, the second regulation step may be implemented automatically.

In this second implementation, the second regulation step may be implemented without any specific action from the pilot as soon as the rotorcraft has reached the predetermined threshold altitude and the predetermined threshold velocity.

In practice, the regulation method may further comprise a limitation step for limiting a maximum admissible velocity (Vh) to a reduced value (Vh1), said maximum admissible velocity (Vh) corresponding to the forward velocity of the rotorcraft when each main engine is caused to operate at its maximum continuous power level.

Indeed, the increase in the torque transmitted to the main rotor by the power plant may be compensated for by limiting the forward velocity of the rotorcraft. In practice, such a reduced value (Vh1) may, for example, correspond to 90% of the maximum admissible forward velocity (Vh) of the rotorcraft at maximum continuous power.

In an implementation of the invention, the regulation method may further comprise a third regulation step following on from the second regulation step and for regulating operation of the secondary engine(s) on the first setpoint (NR1) for the speed of rotation (NR).

Optionally, the one or more secondary engines may be electric motors that are connected mechanically to the main gearbox. Prior to this third regulation step, the secondary engine(s) may operate in alternator or receiver mode so as to generate electrical energy and so as to recharge an electrical energy storage battery if necessary.

A third regulation step is then implemented if an instantaneous and large power need occurs or is identified.

Such a second engine unit then makes it possible cause the speed of rotation (NR) to go quickly back to the first setpoint (NR1). This third regulation step may then be implemented instantly, e.g. in the event of a failure of one or more engines of the first engine unit.

In such a situation, the third regulation step may be implemented for long enough to enable a pilot of the rotorcraft to make a safe descent with a projection cone significantly greater than a projection cone corresponding to an emergency descent under autorotation.

The third regulation step may also be implemented for a short time in such a manner as to preserve a speed of rotation (NR) that facilitates piloting the rotorcraft during a subsequent flight phase in autorotation. In such a situation, the third regulation step is then implemented before an emergency descent is made.

Furthermore, the regulation method may further comprise a monitoring step for measuring control setpoints generated by at least one control member of the rotorcraft, the monitoring step making it possible to anticipate a power need for performing a maneuver of the rotorcraft.

In other words, this monitoring step makes it possible to identify and to satisfy a power need, e.g. for performing an avoidance maneuver, such as going into a nose-down attitude or into a nose-up attitude, or making a tight turn. To perform this monitoring step, the rotorcraft is then equipped with a position anticipation module that is, for example, arranged at the control member for controlling the collective pitch of the blades of the main rotor or indeed at the control member for controlling the cyclic pitch of the blades of the main rotor.

For example, the monitoring step identifies an attitude or trim angle or a roll angle to be reached that is too great when the main rotor is driven in rotation in compliance with the second setpoint (NR2, NR2'). In such a situation, such a monitoring step is then implemented prior to the third regulation step and can make it possible to trigger implementation of said third regulation step.

In practice, following the third regulation step, the regulation method may further comprise a fourth regulation step consisting in regulating a speed of rotation of the main engine(s) by increasing the current setpoint (NRi) from the second setpoint (NR2, NR2') up to the first setpoint (NR1).

In other words, once the speed of rotation (NR) of the rotor has been brought to the level of the first setpoint (NR1) by the second engine unit, the fourth regulation step can then be implemented to increase the current setpoint (NRi) transmitted to the first engine unit. Such a fourth regulation step thus makes it possible to limit the mechanical stresses on the first engine unit, which then does not transmit power to the rotor during this phase of increasing the current setpoint (NRi).

The present invention also provides a rotorcraft including:

a power plant comprising two engine units and a main gearbox, the two engine units being suitable for mechanically driving the main gearbox in order to drive an outlet main shaft of the main gearbox in rotation, the outlet main shaft being constrained to rotate with a main rotor of the rotorcraft, the main rotor rotating at a speed of rotation (NR), the power plant further comprising a first computer for determining a first setpoint (NR1) for the speed of rotation (NR) of the main rotor, the two engine units comprising firstly a first engine unit comprising at least one main engine and a first regulation device that regulates operation of the main engine(s) on a current setpoint (NRi) for the speed of rotation (NR) that is equal to the first setpoint (NR1) for the speed of rotation (NR) of the main rotor, and secondly a second engine unit comprising at least one secondary engine and a second regulation device, the second regulation device regulating operation of the secondary engine(s);

first identification means making it possible to identify that the rotorcraft is flying at a height that is greater than or equal to a predetermined threshold height; and second identification means making it possible to identify that the rotorcraft is flying at a velocity that is greater than or equal to a predetermined threshold velocity.

In accordance with the invention, such a rotorcraft is remarkable in that if the first identification means identify that the rotorcraft is flying at a height greater than or equal to the predetermined threshold height and if the second identification means simultaneously identify that the rotorcraft is flying at a velocity greater than or equal to the predetermined threshold velocity, the first regulation device is configured to regulate a speed of rotation of the main engine(s) by progressively reducing the current setpoint (NRi) by an increment i in percentage per second, from the first setpoint (NR1) down to a second setpoint (NR2, NR2') that is less than the first setpoint (NR1), the current setpoint (NRi) for the speed of rotation (NR) being reduced so long as a norm of an acceleration vector of the rotorcraft is less than 1 m·s$^{-2}$.

In other words, such a rotorcraft makes it possible to regulate a speed of rotation of the main engine(s) to a level very significantly less than the level corresponding to the first setpoint (NR1) without increasing the risk of stalling.

In addition, so long as the velocity of the rotorcraft is constant or variable to only a small extent, such a rotorcraft then has the capacity to fly while drastically limiting its acoustic footprint on the outside environment.

The norm of the acceleration vector may, for example, be measured directly by means of an accelerometer equipping the rotorcraft. This norm may also be computed on the basis of data relating to the position or to the velocity of the rotorcraft relative to the ground. In addition, the current setpoint (NRi) for the speed of rotation (NR) may be reduced preferably so long as the norm of the acceleration vector of the rotorcraft is less than 0.5 m·s$^{-2}$, and even more preferably so long as the norm of the acceleration vector of the rotorcraft is less than 0.33 m·s$^{-2}$.

Furthermore, the first identification means may, for example, include an altimeter for measuring a current height of the rotorcraft above ground, a memory for storing the predetermined threshold and a computation unit for comparing the current height of the rotorcraft with the predetermined threshold height and for analyzing the result of this first comparison.

Similarly, the second identification means may, for example, include a velocity sensor for measuring a velocity of movement of the rotorcraft relative to the ground, a sensor for sensing the position or the acceleration of the rotorcraft, and computation means for determining a velocity of the rotorcraft relative to the ground, a memory for storing the predetermined threshold velocity, and another computation unit for comparing the current velocity of the rotorcraft with the predetermined threshold velocity and for analyzing the result of this second comparison.

In addition, the first computer that determines the first setpoint (NR1) and the computation unit(s) that perform(s) the comparisons may be distinct from one another or indeed be constituted by a common computer or unit.

Similarly, the first regulation device may be distinct from or common with the second regulation device.

Advantageously, the rotorcraft may further include:

a second computer for computing a current value (Czmi) for a mean lift coefficient (Czm) of the main rotor; and an analysis unit for comparing the current value (Czmi) of the mean vertical lift coefficient (Czm) with a threshold value (Czm1), the second setpoint (NR2, NR2') depending on a result of the comparison performed by the analysis unit.

Thus, and as mentioned above, the value of the second setpoint (NR2, NR2') may depend on the current value (Czmi) computed by the second computer. Furthermore, the threshold value (Czm1) may be pre-recorded in a first memory and/or be variable and defined by computations as a function of the flight conditions such as atmospheric pressure or temperature of the surrounding air.

Such a second computer and an analysis unit may be distinct from each other or indeed be common with each other. In addition, they may also be common with the first computer and with the computation unit(s) performing the comparisons.

In practice, if the current value (Czmi) remains less than the threshold value (Czm1), the first regulation device may reduce the current setpoint (NRi) down to the second setpoint (NR2), it then being possible for the second setpoint (NR2) to lie in the range 60% of the nominal value (NRnom) to 85% of the nominal value (NRnom). By way of comparison, the first setpoint (NR1) may, for example, lie in the range 90% of the nominal value (NRnom) to 110% of the nominal value (NRnom).

In this situation, the second setpoint (NR2) may then be fixed and defined by computation, tests or simulations, and be pre-recorded in a second memory.

In addition, the second setpoint (NR2) may, for example, be chosen to be equal to 70% of the nominal value (NRnom).

In another aspect of the invention, if the current value (Czmi) reaches the threshold value (Czm1), the first regulation device may regulate the speed of rotation of the main engine to the second setpoint (NR2') corresponding to the current setpoint (NRi) for the speed of rotation (NR) and for which the current value (Czmi) is equal to the threshold value (Czm1).

In this situation, the second setpoint (NR2') may then vary as a function of the current value (Czmi). In addition, the first regulation device may limit the value of the second setpoint (NR2') to a value greater than 70% of the nominal value (NRnom).

Furthermore, the second regulation device may regulate operation of the secondary engines on the first setpoint (NR1) of the speed of rotation (NR).

Thus, for example, during a failure of the main engine(s), the second regulation device may then be activated automatically to make it possible to increase the speed of rotation (NR) rapidly and to tend to bring it back to the level of the first setpoint (NR1). Such an action then enables the pilot of the rotorcraft to preserve a speed of rotation (NR) of the rotor that is sufficient to reach a landing area safely, or indeed to make an emergency landing by performing a flight phase in autorotation with a high level of safety.

Advantageously, the rotorcraft may further include monitoring means for measuring control setpoints generated by at least one control member of the rotorcraft, the monitoring means making it possible to anticipate a power need for performing a maneuver of the rotorcraft.

The monitoring means then include sensors suitable for measuring the control setpoints making it possible, for example, to control the roll and/or attitude angles and/or the values for the pitch of the blades varying cyclically and collectively. Such control setpoints are then compared with threshold values making it possible to anticipate the power need for performing, for example, an avoidance maneuver such as a tight turn.

In practice, in the event of a power need for performing a maneuver of the rotorcraft, the second regulation device may regulate operation of the secondary engine(s) on the first setpoint (NR1) for the speed of rotation (NR).

Thus, like during a failure of the main engine(s), the second regulation device makes it possible to increase the speed of rotation (NR) of the rotor rapidly for performing an avoidance maneuver. Once the rotor reaches the speed of rotation (NR) corresponding to the first setpoint (NR1) by means of the secondary engine, then the first regulation device can regulate the speed of the main engine upwards until it reaches the first setpoint (NR1).

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements that are present in more than one of the figures are given the same references in each of them.

Figure 1:
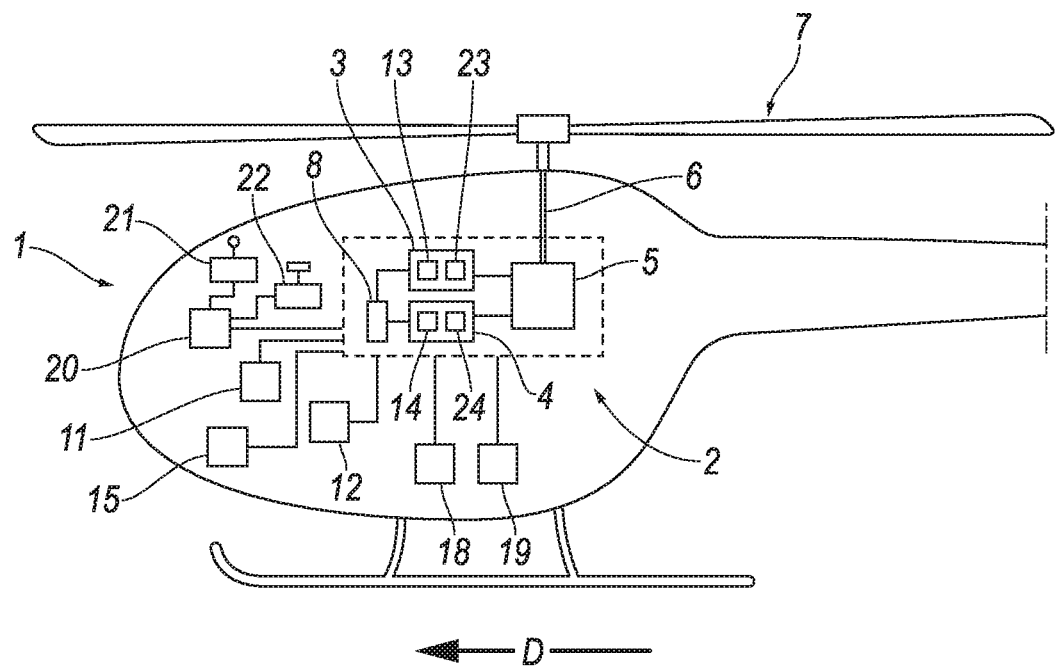
FIG. 1 a diagram of a rotorcraft of the invention.

As shown in FIG. 1, a rotorcraft 1 of the invention thus has a main rotor 7 that rotates at a speed of rotation NR, a power plant 2 comprising two engine units 3 and 4 and a main gearbox 5 driven simultaneously or individually by the two engine units 3 and 4. The main gearbox 5 has a main outlet shaft 6 that is constrained to rotate with the main rotor 7.

In addition, the power plant 2 has a first computer 8 that makes it possible to determine a first setpoint NR1 for the speed of rotation NR of the main rotor 7. The first setpoint NR1 then lies in the range 90% of a nominal value NRnom to 110% of the nominal value NRnom.

The first engine unit 3 comprises at least one main engine 13 and at least one first regulation device 23 for regulating operation of the main engine 13 on a current setpoint NRi that may, at least temporarily, be equal to the first setpoint NR1. Advantageously, such a main engine 13 may be formed by a turboshaft engine fed with fuel and, in particular, having a turbine connected via a mechanical system to a first inlet shaft of the main gearbox 5.

The second engine unit 4 comprises at least one secondary engine 14 and at least one second regulation device 24 for regulating operation of the secondary engine 14. Said secondary engine 14 may, for example, be formed by an electric motor powered with electrical energy and connected mechanically to a second inlet shaft of the main gearbox 5.

Furthermore, the first regulation device 23 and the second regulation device 24 may be distinct from each other or indeed they may be formed by a common regulation device.

The rotorcraft 1 also has first identification means 11 for identifying that the rotorcraft 1 is flying at a height H greater than or equal to a predetermined threshold height H1, and second identification means 12 for identifying that the rotorcraft 1 is flying at a velocity V greater than or equal to a predetermined threshold velocity V1.

Such a rotorcraft 1 may also have an accelerometer 15 suitable for measuring components of an acceleration vector of the rotorcraft 1 in the air. Computation means then make it possible to deduce the norm for such an acceleration vector. Furthermore, this norm for the acceleration vector may also be computed on the basis of data relating to the position or to the velocity of movement of the rotorcraft 1 in the air.

Furthermore, if the first identification means 11 identify that the rotorcraft 1 is flying at a height H greater than or equal to the predetermined threshold height H1, and if the second identification means 12 identify that the rotorcraft 1 is flying at a velocity V greater than or equal to the predetermined threshold velocity V1, then the first regulation device 23 is configured to regulate a speed of rotation of the main engine 13 by progressively reducing a current setpoint NRi for the speed of rotation NR by an increment i in percentage of the current setpoint (NRi) per second. Such a reduction in the current setpoint NRi is thus made from the first setpoint NR1 to a second setpoint NR2, NR2' that is less than the first setpoint NR1.

In addition, this reduction in the current setpoint NRi for the speed of rotation NR is performed so long as the norm for the acceleration vector of the rotorcraft 1 is less than 1 m·s$^{-2}$, preferably so long as it is less than 0.5 m·s$^{-2}$, and even more preferably so long as it is less than 0.33 m·s$^{-2}$. Such an acceleration of the rotorcraft 1 is then representative of a stable and/or almost-constant velocity of the rotorcraft 1 relative to the ground.

Figure 2:
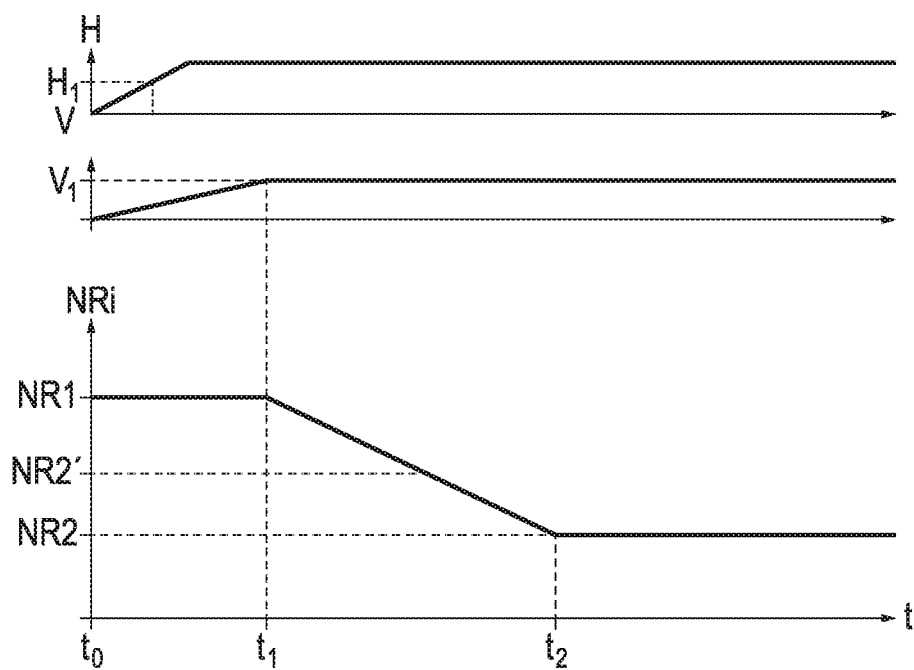
FIG. 2 shows a curve illustrating variations in a current setpoint for the speed of rotation of the main rotor as a function of time, in accordance with the invention.

Such a reduction in the current setpoint NRi may thus, as shown in FIG. 2, be performed linearly between two instants t1 and t2 to reach the second setpoint NR2, NR2' as from instant t2.

Furthermore, in the event of failure of the main engine 13 or when there is a sudden need for power, requiring a rapid increase in the speed of rotation NR of the main rotor 7, the second regulation device 24 can instantly regulate operation of each secondary engine 14 on the first setpoint NR1.

Furthermore, the rotorcraft 1 also has a second computer 18 for computing a current value Czmi for a mean lift coefficient Czm of the main rotor, and an analysis unit 19 for comparing said current value Czmi of the mean vertical lift coefficient Czm with a threshold value Czm1.

Furthermore, in such a situation, the value of the second setpoint NR2' then depends on the result of this comparison performed by the analysis unit 19.

Figure 3:
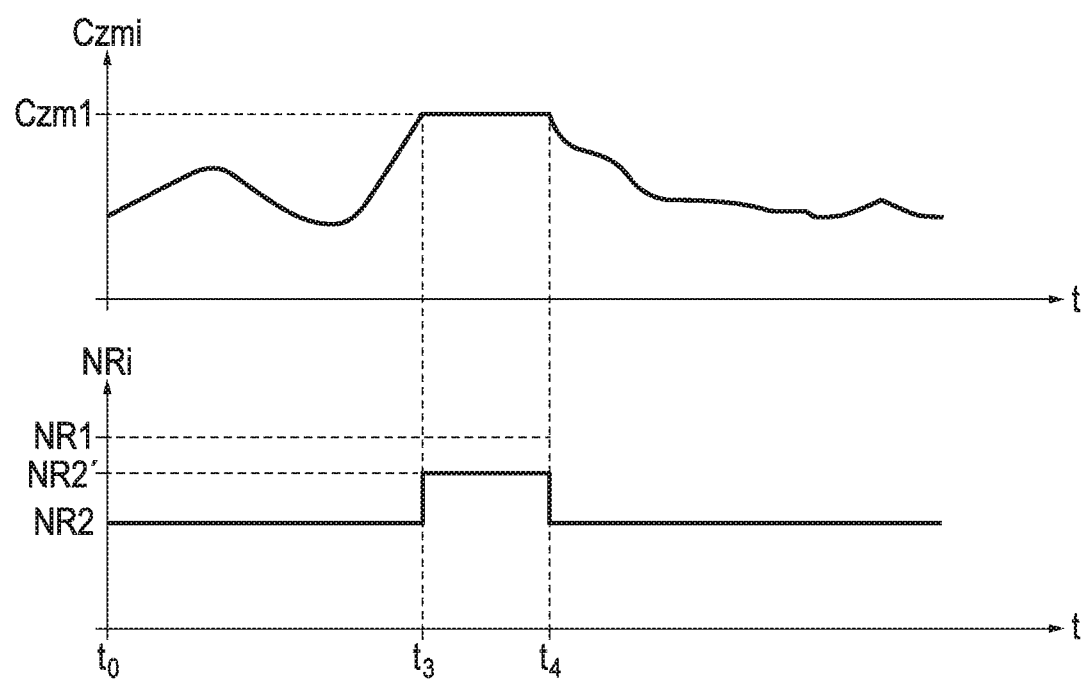
FIG. 3 shows curves illustrating variations in a current value of the mean vertical lift coefficient and in the current value of the speed of rotation of the main rotor as a function of time, in accordance with the invention.

As shown in FIG. 3, the current setpoint NRi may vary under the dependence of the current value Czmi of the mean vertical lift coefficient Czm.

Before instant t3, the current value Czmi is less than the threshold value Czm1, and after that instant the current setpoint NRi may be chosen to be equal to the second setpoint NR2.

From instants t3 to t4, the current value Czmi is limited to a ceiling by being maintained equal to the threshold value Czm1. In this situation, the current setpoint NRi may be assigned to the second setpoint NR2' and be greater than the second setpoint NR2.

In practice, the second setpoint NR2 lies in the range 60% of the nominal value NRnom to 85% of the nominal value NRnom, while the second setpoint NR2' lies in the range 70% of said nominal value NRnom to 100% of said nominal value NRnom.

Furthermore, and with reference to FIG. 1, the rotorcraft 1 may also have monitoring means 20 for measuring control setpoints generated by a control member such as a "collective" pitch control lever 21 and a "cyclic" pitch control stick 22 of the rotorcraft 1.

In addition, such monitoring means 20 then make it possible to anticipate a power need for performing a maneuver, e.g. for example an avoidance maneuver, such as going into a nose-down attitude or into a nose-up attitude, or making a tight turn.

As shown in FIGS. 4 to 7, the invention also relates to a regulation method 30, 30', 40, 50 for regulating the power plant 2 equipping the rotorcraft 1.

Figure 4:
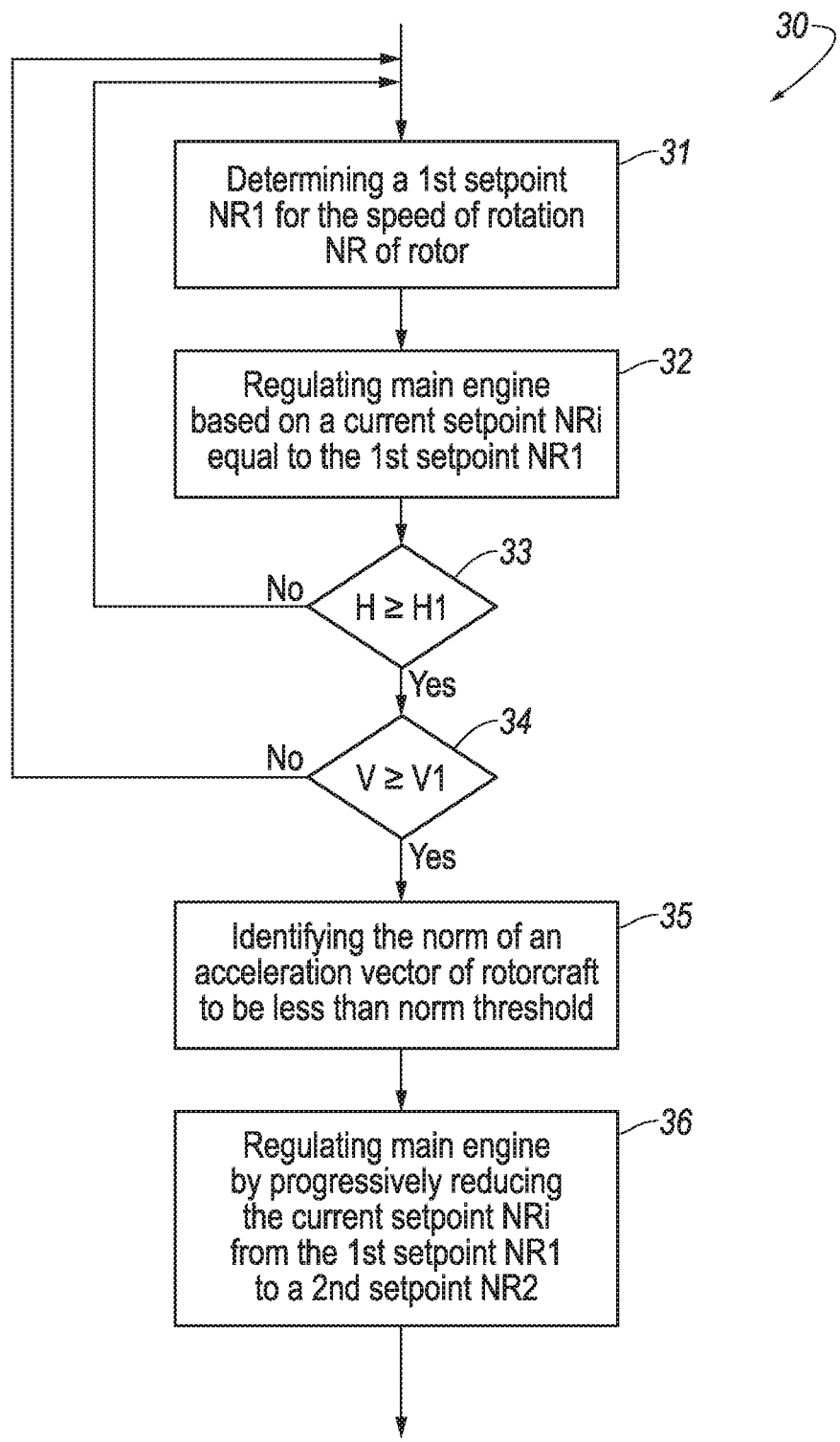
FIG. 4 is a flow chart illustrating a first example of the regulation method of the invention.

Thus, FIG. 4 shows a first example of a regulation method 30 that includes a determination step 31 for determining the first setpoint NR1 for the speed of rotation NR of the main rotor 7, and then a first regulation step 32 for regulating operation of the main engine 13 on a current setpoint NRi that is equal to the first setpoint NR1.

The regulation method 30 then includes a first identification step 33 making it possible to identify that the rotorcraft 1 is flying at a height H that is greater than or equal to the predetermined threshold height H1. Thus, so long as the height H is less than the predetermined threshold height H1, the determination step 31 for determining the first setpoint NR1 and the first regulation step 32 are implemented.

When the height of the rotorcraft 1 is greater than a threshold height of, for example, 1500 feet (about 457 meters), the method 30 includes a second identification step 34 making it possible to identify that the rotorcraft 1 is flying at a velocity V that is greater than or equal to a predetermined threshold velocity V1.

As above, so long as the velocity V is less than the predetermined threshold velocity V1, the method 30 loops back to the determination step 31 for determining the first setpoint NR1. For example, such a predetermined threshold velocity V1 may be chosen to be equal to 80 knots (approximately 41 m·s$^{-1}$).

Conversely, when the velocity V becomes greater than or equal to the predetermined threshold velocity V1, the method 30 includes an identification step 35 for identifying the norm of an acceleration vector of the rotorcraft 1.

Such a regulation method 30 then includes a second regulation step 36 consisting in regulating each main engine 13 by progressively reducing the current setpoint NRi by an increment i in percentage of the current setpoint NRi per second, from the first setpoint NR1 down to a second setpoint NR2 that is less than the first setpoint NR1.

In addition, such a second regulation step 36 is then performed so long as the norm of the acceleration vector of the rotorcraft 1 is less than 1 m·s$^{-2}$, preferably so long as it is less than 0.5 m·s$^{-2}$, and even more preferably so long as it is less than 0.33 m·s$^{-2}$.

In this first example of a regulation method 30, such a second regulation step 36 may be implemented manually by a pilot of the rotorcraft 1 who wishes to regulate each main engine 13 with a current setpoint NRi that is considerably reduced relative to the nominal value NRnom, thereby making it possible to reduce the level of the acoustic footprint of the rotorcraft 1 during at least one flight phase.

Figure 5:
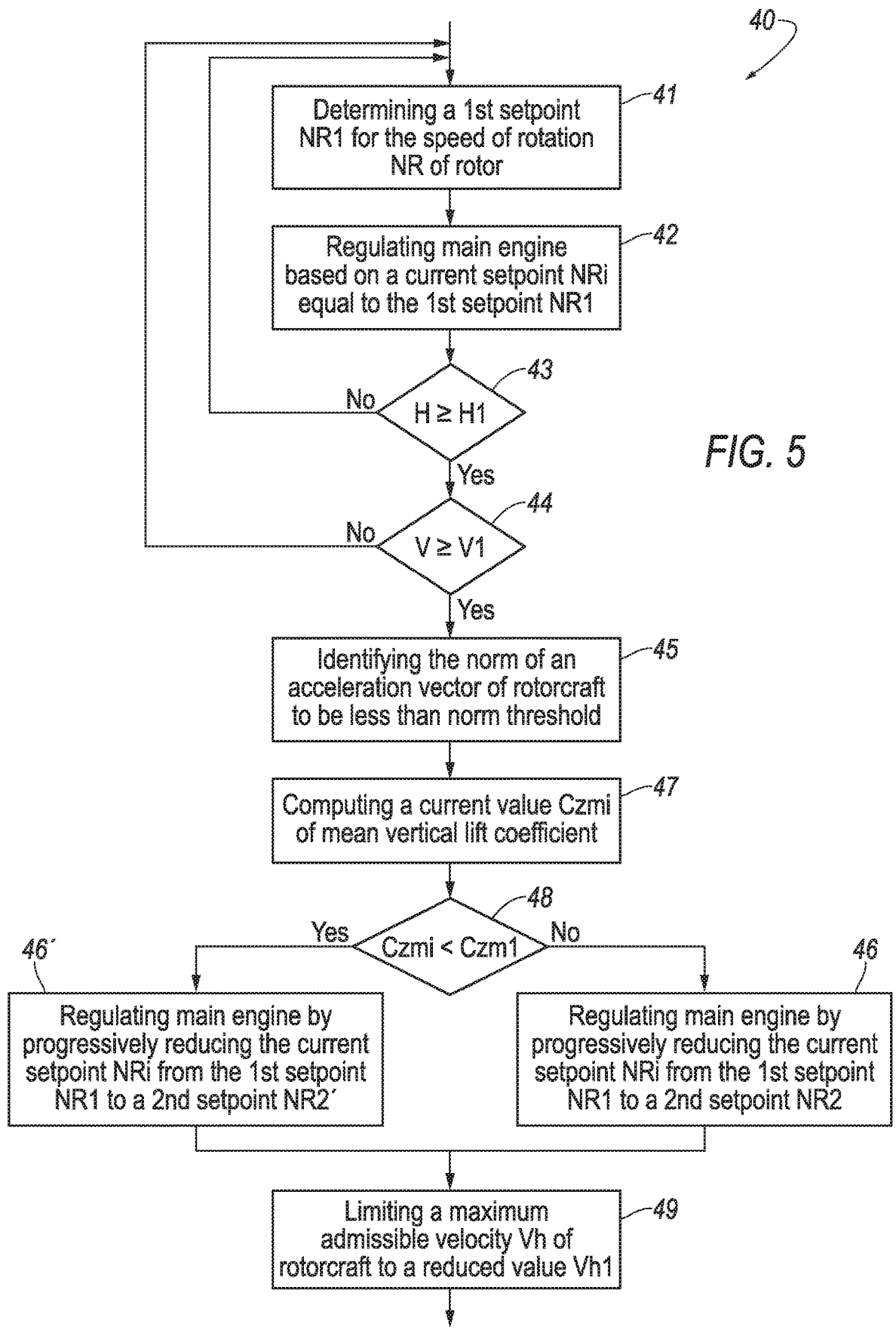
FIG. 5 is a flow chart illustrating a second example of the regulation method of the invention.

As shown in FIG. 5, and as above, a second example of a regulation method 40 includes a determination step 41 for determining the first setpoint NR1, a first regulation step 42 for regulating operation of the main engine 13, and identification steps 43, 44, and 45.

Such a regulation method 40 also includes a computation step 47 for computing the current value Czmi for the mean vertical lift coefficient Czm and a comparison step 48 for comparing the current value Czmi with the threshold value Czm1. In this situation, the value for the second setpoint NR2, NR2' then depends on the result of the comparison step 48.

Furthermore, such a regulation method 40 then includes two second regulation steps 46, 46' for acting as a function of the result of the comparison step 48 to regulate each main engine 13 by progressively reducing the current setpoint NRi from the first setpoint NR1 down to the second setpoint NR2, or down to the second setpoint NR2'.

As described above, the second regulation step 46 can then regulate each main engine 13 by progressively reducing the current setpoint NRi from the first setpoint NR1 down to the second setpoint NR2, which, in this situation, is predetermined and may, for example, lie in the range 60% of the nominal value NRnom to 85% of the nominal value NRnom.

Conversely, if the current value Czmi reaches the threshold value Czm1, then the other second regulation step 46' regulates each main engine 13 by progressively reducing the current setpoint NRi from the first setpoint NR1 down to the second setpoint NR2' corresponding to the current setpoint NRi for which the current value Czmi for the mean vertical lift coefficient Czm is equal to the threshold value Czm1.

In addition, the second regulation step 46, 46' may be implemented automatically without requiring any particular action from the pilot of the rotorcraft 1.

Furthermore, as shown, the regulation method 40 may further include a limitation step 49 for limiting a maximum admissible velocity Vh to a reduced value Vh1, said maximum admissible velocity Vh corresponding to the forward velocity of the rotorcraft 1 when each main engine 13 is caused to operate at its maximum continuous power level. For example, a reduced value Vh1 may be equal to 90% of the velocity Vh.

Figure 6:
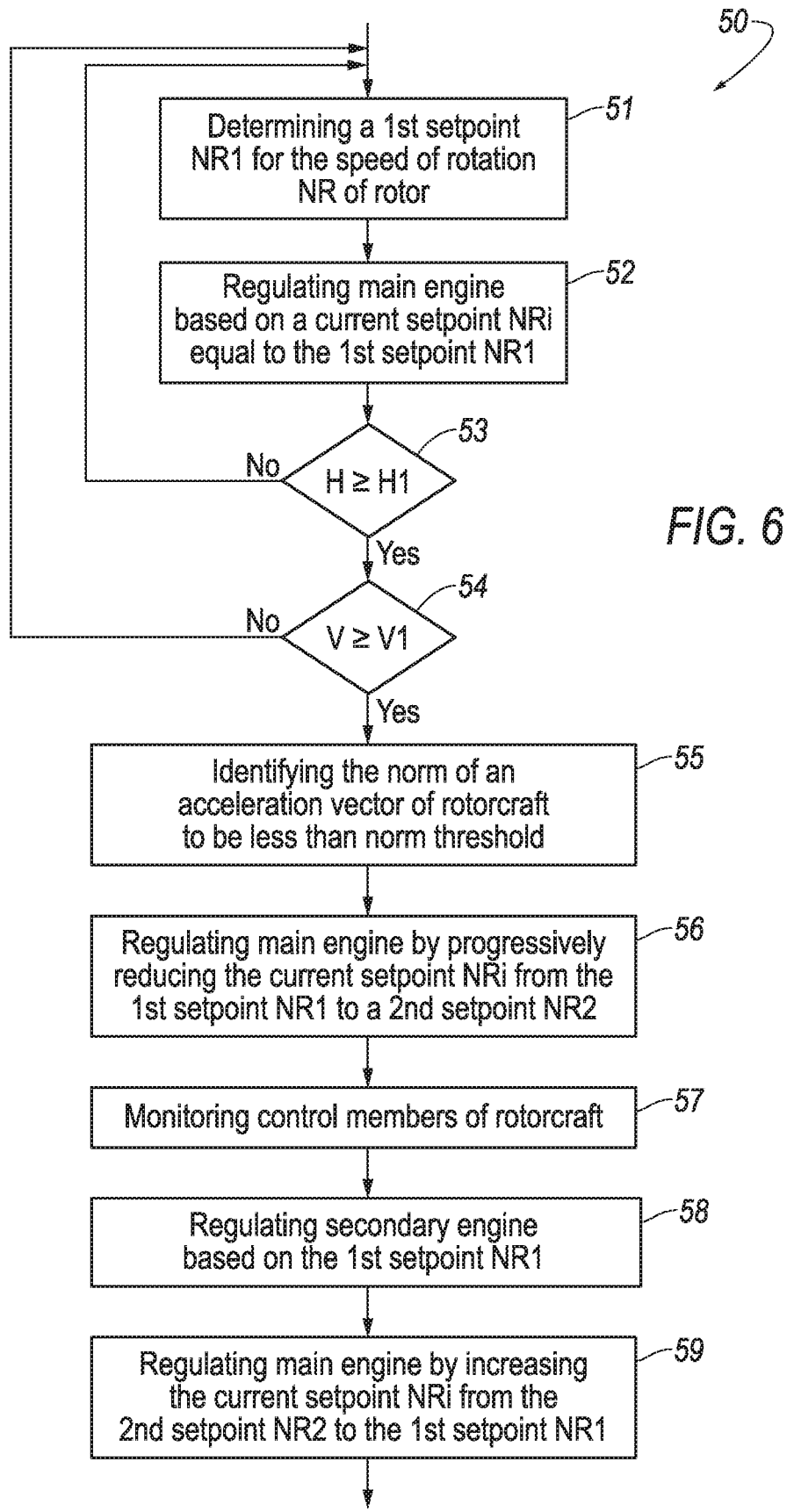
FIG. 6 is a flow chart illustrating a third example of the regulation method of the invention.

As shown in FIG. 6, and as above, a third example of a regulation method 50 includes a determination step 51 for determining the first setpoint NR1, a first regulation step 52 for regulating operation of each main engine 13, identification steps 53, 54, and 55, and a second regulation step 56.

In addition, such a regulation method 50 further includes a monitoring step 57 for measuring control setpoints generated by the control members 21 and 22 of the rotorcraft 1. This monitoring step 57 can then make it possible to anticipate a power need for maneuvering the rotorcraft 1.

Thus, the regulation method 50 may then include a third regulation step 58 for at least temporarily regulating the second engine 14 on the first setpoint NR1 for the speed of rotation NR.

In such a situation, and once the main rotor 7 has reached the speed of rotation corresponding to the first setpoint NR1, the method 50 may then include a fourth regulation step 59 making it possible to regulate the speed of rotation of the main engine 13 by increasing its current setpoint NRi, from the second setpoint NR2, NR2' up to the first setpoint NR1.

Figure 7:
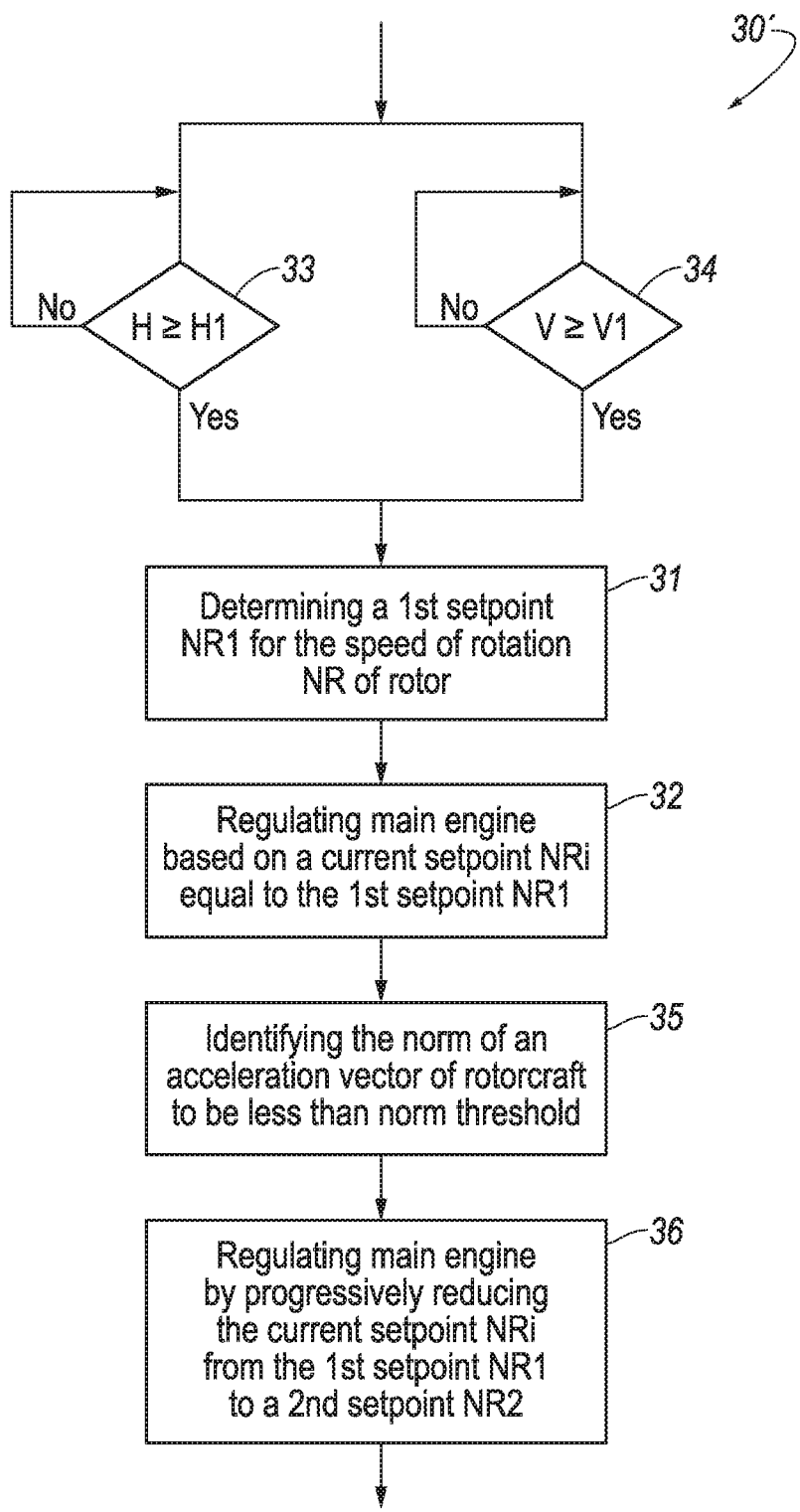
FIG. 7 is a flow chart illustrating a fourth example of the regulation method of the invention.

As shown in FIG. 7, and as above, a fourth example of a regulation method 30' includes a determination step 31 for determining the first setpoint NR1, a first regulation step 32 for regulating operation of each main engine 13, identification steps 33, 34, and 35, and a second regulation step 36.

However, in this fourth example of a regulation method 30', and unlike in the first example of a regulation method 30, the identification steps 33 and 34 may be implemented prior to the determination step 31 for determining the first setpoint NR1.

The regulation method 30' may then include a preliminary regulation step (not shown) for regulating operation of each main engine 13 on a current setpoint NRi that is equal to an initial setpoint NR0. Furthermore, such an initial setpoint NR0 may, for example, correspond to a setpoint adapted to enable the rotorcraft 1 to effect a hovering flight phase in which it is stationary relative to the ground.

Naturally, the present invention can be the subject of numerous variants as to its implementation. Although several implementations and embodiments are described, it should readily be understood that it is not conceivable to identify exhaustively all possible implementations and embodiments. It is naturally possible to envisage replacing any of the means described by equivalent means without going beyond the ambit of the present invention.

What is claimed is:

1. A regulation method for regulating a power plant of a rotorcraft, the power plant having two engine units and a main gearbox, the two engine units being suitable for mechanically driving the main gearbox so as to drive an outlet main shaft of the main gearbox in rotation, the outlet main shaft being constrained to rotate with a main rotor of the rotorcraft, the main rotor rotating at a speed of rotation, the two engine units comprising a first engine unit including at least one main engine and a second engine unit including at least one secondary engine, the regulation method comprising at least:
 a determination step for determining a first setpoint for the speed of rotation of the main rotor;
 a first regulation step for regulating operation of the at least one main engine based on a current setpoint for the speed of rotation of the main rotor that is equal to the first setpoint for the speed of rotation of the main rotor;
 a first identification step allowing to identify that the rotorcraft is flying at a height that is greater than or equal to a predetermined threshold height, wherein the first identification step is satisfied; and
 a second identification step allowing to identify that the rotorcraft is flying at a velocity that is greater than or equal to a predetermined threshold velocity, wherein the second identification step is satisfied;
 the regulation method further comprising a second regulation step being implemented when the first identification step and the second identification step are satisfied simultaneously, the second regulation step consisting in regulating a speed of rotation of the at least one main engine by progressively reducing the current setpoint by an increment i in percentage of the current setpoint per second, from the first setpoint down to a second setpoint that is less than the first setpoint, to thereby reduce an acoustic footprint of the rotorcraft, the second regulation step being implemented so long as a norm of an acceleration vector of the rotorcraft is less than 1 m·s$^{-2}$.

2. The method according to claim 1,
 wherein the increment i lies in the range −0.2% of the current setpoint per second to −0.6% of the current setpoint per second.

3. The method according to claim 1,
 the regulation method further comprises a computation step for computing a current value for a mean vertical lift coefficient of the main rotor, and a comparison step for comparing the current value for the mean vertical lift coefficient with a threshold value, the second setpoint depending on the result of the comparison step.

4. The method according to claim 3,
 wherein, during the second regulation step, if the current value remains less than the threshold value, then the second setpoint lies in the range 60% of the nominal value to 85% of the nominal value.

5. The method according to claim 3,
 wherein, during the second regulation step, if the current value reaches the threshold value, then the second setpoint corresponds to the current setpoint for the speed of rotation of the main rotor.

6. The method according to claim 3,
 the second setpoint lies in the range 70% of the nominal value to 100% of the nominal value.

7. The method according to claim 3,
 the threshold value lies in the range 0.4 to 0.8.

8. The method according to claim 1,
 the second regulation step is implemented manually by a pilot of the rotorcraft.

9. The method according to claim 1,
 the second regulation step is implemented automatically.

10. The method according to claim 1,
wherein the regulation method further comprises a limitation step for limiting a maximum admissible velocity to a reduced value, the maximum admissible velocity corresponding to the forward velocity of the rotorcraft when each main engine is caused to operate respectively at a maximum continuous power level.

11. The method according to claim 1,
wherein the regulation method further comprises a third regulation step following the second regulation step and for regulating operation of the at least one secondary engine based on the first setpoint for the speed of rotation of the main rotor.

12. The method according to claim 1,
wherein the regulation method further comprises a monitoring step for measuring control setpoints generated by at least one control member of the rotorcraft, the monitoring step allowing to anticipate a power need for performing a maneuver of the rotorcraft.

13. The method according to claim 12,
wherein, following the third regulation step, the regulation method further comprises a fourth regulation step consisting in regulating a speed of rotation of the at least one main engine by increasing the current setpoint from the second setpoint up to the first setpoint.

14. A rotorcraft including:
a power plant comprising two engine units and a main gearbox, the two engine units being suitable for mechanically driving the main gearbox in order to drive an outlet main shaft of the main gearbox in rotation, the outlet main shaft being constrained to rotate with a main rotor of the rotorcraft, the main rotor rotating at a speed of rotation, the power plant further comprising a first computer for determining a first setpoint for the speed of rotation of the main rotor, the first setpoint lying in the range 90% of a nominal value to 110% of the nominal value, the two engine units comprising firstly a first engine unit comprising at least one main engine and a first regulation device that regulates operation of the at least one main engine based on a current setpoint for the speed of rotation of the main rotor that is equal to the first setpoint for the speed of rotation of the main rotor, and secondly a second engine unit comprising at least one secondary engine and a second regulation device, the second regulation device regulating operation of the at least one secondary engine;
first identification means allowing to identify that the rotorcraft is flying at a height that is greater than or equal to a predetermined threshold height; and
second identification means allowing to identify that the rotorcraft is flying at a velocity that is greater than or equal to a predetermined threshold velocity;
wherein if the first identification means identify that the rotorcraft is flying at a height greater than or equal to the predetermined threshold height and if the second identification means simultaneously identify that the rotorcraft is flying at a velocity greater than or equal to the predetermined threshold velocity, the first regulation device is further configured to regulate a speed of rotation of the at least one main engine by progressively reducing the current setpoint by an increment i in percentage of the current setpoint per second, from the first setpoint down to a second setpoint that is less than the first setpoint, to thereby reduce an acoustic footprint of the rotorcraft, the current setpoint being progressively reduced so long as a norm of an acceleration vector of the rotorcraft is less than $1 \text{ m} \cdot \text{s}^{-2}$.

15. The rotorcraft according to claim 14,
the rotorcraft further includes:
a second computer for computing a current value for a mean lift coefficient of the main rotor; and
an analysis unit for comparing the current value of the mean vertical lift coefficient with a threshold value, the second setpoint depending on a result of the comparison performed by the analysis unit.

16. The rotorcraft according to claim 15,
wherein if the current value remains less than the threshold value, then the second setpoint lies in the range 60% of the nominal value to 85% of the nominal value.

17. The rotorcraft according to claim 15,
wherein if the current value reaches the threshold value, then the second setpoint corresponds to the current setpoint for the speed of rotation of the main rotor.

18. The rotorcraft according to claim 14,
the second regulation device regulates operation of the at least one secondary engine based on the first setpoint for the speed of rotation.

19. The rotorcraft according to claim 14,
the rotorcraft further includes monitoring means for measuring control setpoints generated by at least one control member of the rotorcraft, the monitoring means allowing to anticipate a power need for performing a maneuver of the rotorcraft.

20. The rotorcraft according to claim 19,
wherein, in the event power is needed for performing a maneuver of the rotorcraft, the second regulation device regulates operation of the at least one secondary engine based on the first setpoint for the speed of rotation of the main rotor.

* * * * *